Figure 1:
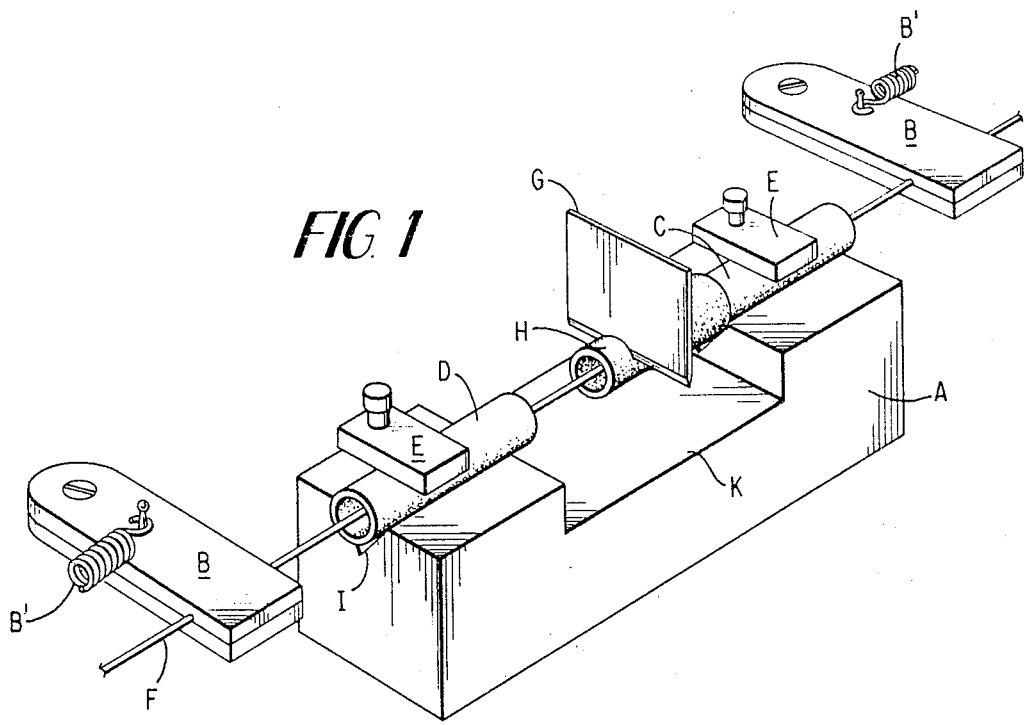

United States Patent [19]

Mead

[11] 4,333,705
[45] Jun. 8, 1982

[54] JIG FOR COUPLING OF OPTIC-WAVEGUIDE ELEMENTS

[75] Inventor: John F. Mead, Princes Risboro, England

[73] Assignee: Plessey Mandel und Investments A.G., Zug, Switzerland

[21] Appl. No.: 89,724

[22] Filed: Oct. 31, 1979

Related U.S. Application Data

[62] Division of Ser. No. 835,918, Sep. 23, 1977, Pat. No. 4,195,045.

[30] Foreign Application Priority Data

Sep. 25, 1976 [GB] United Kingdom .............. 39905/76

[51] Int. Cl.³ .............................................. G02B 5/172
[52] U.S. Cl. .................................. 350/96.20; 156/296; 264/1.5
[58] Field of Search ...................... 350/96.20; 264/1.5; 156/296; 29/520

[56] References Cited

U.S. PATENT DOCUMENTS

| | | | |
|---|---|---|---|
| 4,023,886 | 5/1977 | Nakayama | 350/96.21 |
| 4,029,390 | 6/1977 | Chinnock | 350/96.20 |
| 4,084,308 | 4/1978 | Runge | 350/96.20 X |
| 4,229,402 | 10/1980 | Villaruel et al. | 350/96.20 X |

FOREIGN PATENT DOCUMENTS

| | | | |
|---|---|---|---|
| 2310579 | 12/1976 | France | 350/96.20 |
| 55-120008 | 9/1980 | Japan | 264/1.5 |

OTHER PUBLICATIONS

"Fiber Optic Connectors, an effective Solution" Electronic Engineering Apr. 1975.

*Primary Examiner*—John K. Corbin
*Assistant Examiner*—Frank Gonzalez
*Attorney, Agent, or Firm*—Fleit & Jacobson

[57] ABSTRACT

Each fibre end of a plurality of fibres to be coupled is placed under longitudinal tension coaxially along an axial bore of a precision cylinder body so that the fibre is accurately aligned with the axis of the cylinder surface of the body whereafter the bore of said body is filled with a resin material which will subsequently set hard, and after setting of the resin material the fibre is snapped, after releasing the tension, either within or closely adjacent to, the mass of resin material, at a point where a cleavage has previously been formed.

4 Claims, 12 Drawing Figures

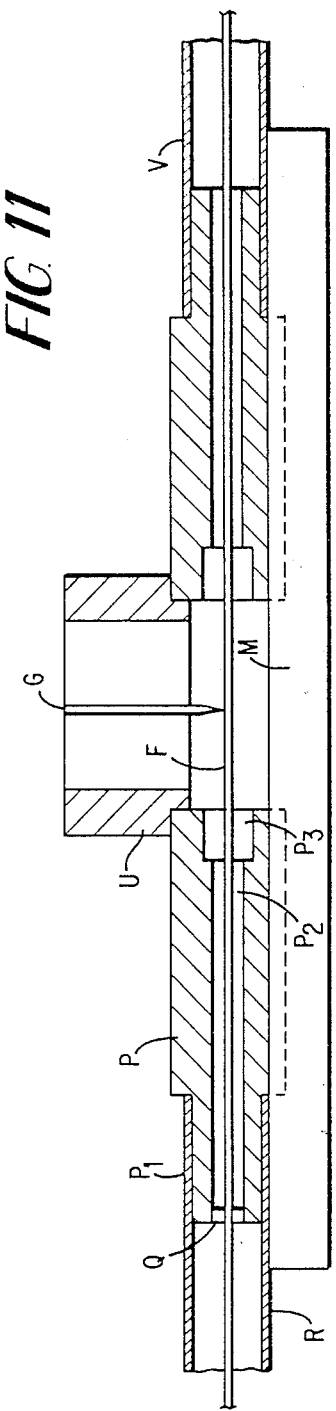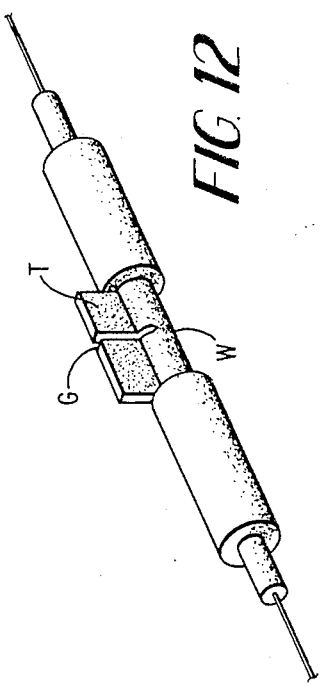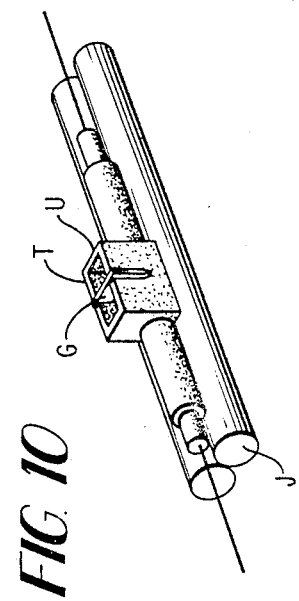

JIG FOR COUPLING OF OPTIC-WAVEGUIDE ELEMENTS

This is a divisional of application Ser. No. 835,918, filed Sept. 23, 1977, now U.S. Pat. No. 4,195,045.

In order to make the use of optic filaments, more particularly single-filament glass fibres, practical on a commercial scale, the possibility of coupling such fibres end-to-end is essential but in view of the very small diameter of such filaments, at present about 5 thou. of an inch or 127 microns in diameter, it has hitherto been found extremely difficult to effect such coupling in the field, and while various forms of coupling connectors have been devised which are intended to make the coupling in the field practicable, these have either been relatively complex and for this reason bulky and/or expensive to manufacture, or the alignment of the fibre ends achieved by them has proved unsatisfactory or at least unreliable. Although, as already mentioned, the present invention is equally applicable to thin optical waveguides other than glass fibres, the term fibre will hereinafter be generally used in order to simplify the description, but it should be understood that this term is intended to cover not only glass fibres but all other waveguide elements of very small diameter to which the technique is applicable.

According to the present invention in a broad aspect, each fibre end intended to be coupled is, under factory or laboratory conditions, placed, under longitudinal tension, coaxially along an axial bore of a precision cylinder body, so that the fibre is accurately aligned with the axis of the cylinder surface of said body, whereafter the bore of said body is filled with a resin material which will subsequently set hard, and after setting of the resin material the fibre is snapped, after releasing the tension, either within or closely adjacent to, the mass of resin material, at a point where a cleavage has previously been formed. The resin material may consist of liquid, hard-setting epoxy or polyester resin. The cylinder body is preferably a cylindrical sleeve closed at one end by an end wall having a coaxial bore that closely fits the fibre. The cleavage for snapping the fibre may be provided by scoring the fibre outside the resin body at a point closely adjacent to the outer surface of this end wall, or the resin material may be arranged to form a body which projects slightly from the open end of the sleeve, in which case the cleavage for snapping the fibre may be provided by scoring the fibre outside, but in close proximity, to the end surface of the projecting portion of the resin material. According to a third, and presently preferred variation, a sleeve consisting of silicone rubber or other resiliently stretchable elastomer material and having, when unstretched, an inside diameter substantially smaller than the outside diameter of the precision-made cylindrical sleeve is placed with an end part of its length over the open end part of the cylindrical precision sleeve, and the latter is closed at its other end by a plug or end wall having a coaxial bore closely fitting the fibre, the fibre being threaded through the thus assembled sleeves and the bores of the end walls thereof, with its free end projecting outwardly through the bore in the plug or end wall closing the elastomer sleeve. Resin material is then arranged to fill the cavity formed jointly by the interior of the precision-cylinder sleeve and the elastomer sleeve, and before the resin material has set, a knife-edge member is introduced, in a plane normal to the axis of the fibre, to cuttingly penetrate through the elastomer sleeve and the resin material. When the resin material has set, the knife-edge member is removed, leaving a cleavage formed in the body of resin material, and when this has been done and the elastomer sleeve has been removed, the part of the resin material body which projects from the open end of the precision sleeve is, together with the fibre enclosed therein, snapped at this cleavage.

The invention also provides a jig which greatly facilitates the attachment of a precision cylindrical sleeve which at one end is closed by an end wall having a coaxial bore that fits closely the diameter of the fibre, to the end portion of a fibre which is to be coupled to, for example, a similarly equipped end of another fibre. According to an aspect of the invention, the jig comprises: means for detachably mounting, in accurate axial alignment with each other, a precision-made cylindrical sleeve which is to be attached to the fibre, and which is closed at one end by an end wall having a coaxial bore closely fitting the fibre and, at an axial distance from this sleeve, a second cylindrical sleeve of similar construction; and means for releasably applying longitudinal tension to a length of fibre which has been threaded through the bores in the respective end walls of the two thus mounted cylindrical sleeves, and which extends through the whole length of at least the first-mentioned sleeve. Preferably the jig is further equipped with means for guiding a knife blade to a position at which it engages the fibre, in a plane normal to the fibre, at a predetermined point between the two mutually facing ends of the cylinder sleeves.

The mounting means of the jig may comprise a rigid support block formed with two longitudinally spaced, accurately aligned lengths of Vee guide or equivalent guide-bed means making two-line tangential contact with the cylinder sleeves, and clamping means for clamping each of the two cylinder sleeves into respective engagement with these lengths of guide-bed means. If desired the guide bed means may comprise two hard, precision-made cylinder bodies secured together side by side, the resulting body being formed with a flat, thereby removing the sleeve-engaging portion of the bed between the two thus spaced lengths of guide-bed.

If desired, each of the two cylinders mounted on the bed may be attached to the tension-stressed fibre, and the fibre subsequently snapped at a point, or points, between the two adjacent ends of the said cylinders, and if intended for such use, the jig may additionally comprise mould means which so co-operate with the two mutually facing open ends of the two cylindrical sleeves mounted on the guide bed means, that injection of suitable resin material into the mould will produce, after setting, a body of resin material which, in addition to two portions respectively filling the interior of both the two sleeves, comprises a connecting portion integrally joining the two said portions, the mould means being formed with guide means for knife-edge means so arranged that the knife-edge means will engage the fibre at a point halfway between the two mutually adjacent ends of the two sleeves.

It will be readily appreciated that, if the fibre were to be located in a precision-made cylindrical body by threading it through a cylindrical bore extending axially throughout the length of this body, the diameter of this bore would, in order to make it possible to push the fibre through it, have to be appreciably larger in diameter than the fibre itself, thus resulting in an unsatisfactory low degree of coaxial alignment, whereas an accurately coaxial bore in a relatively thin end wall of an accurately cylindrical sleeve will permit threading of the fibre even when this bore is of a diameter closely fitting the diameter of the sleeve, because the short length of this bore will minimise the risk of buckling of the end portion of the fibre while it is being threaded. For this reason accurately coaxial alignment of a fibre in two such sleeves which are mounted in accurate axial alignment will be ensured by the mere fact that the fibre is threaded through the bores in the respective end walls of the two sleeves. This permits the jig to be of simple construction because no separate fibre centering means need be added to the jig.

Figure 2:
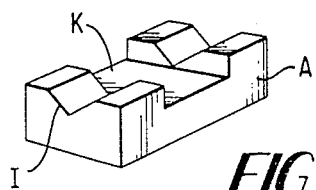
Figure 3:
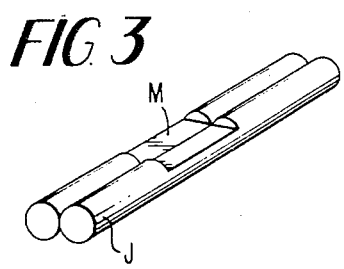
Figure 4:
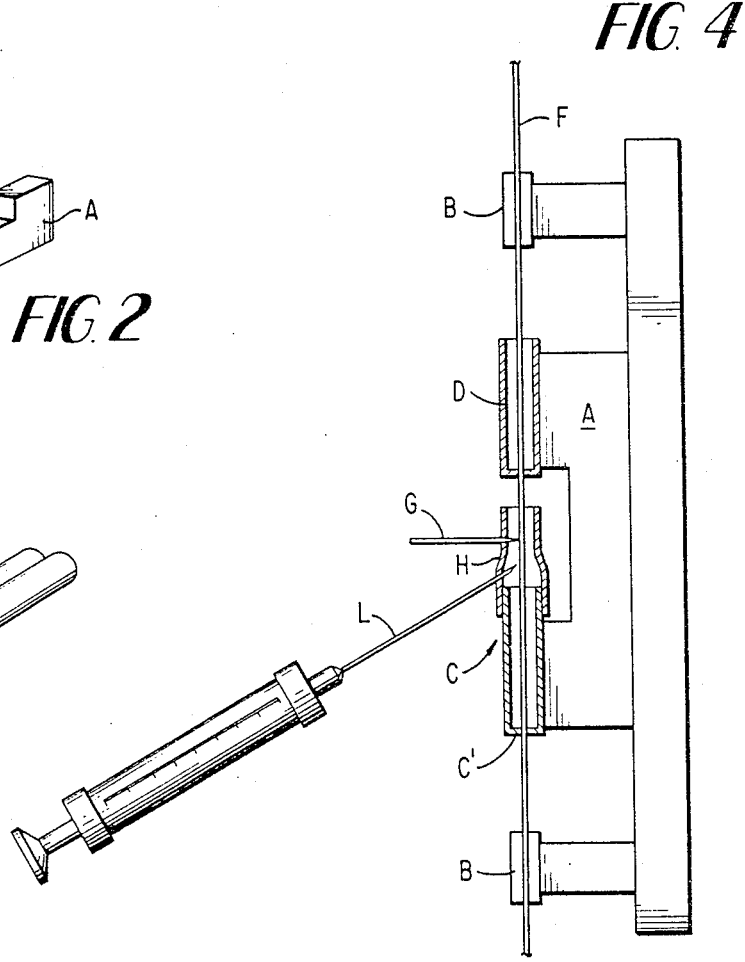
Figure 5:
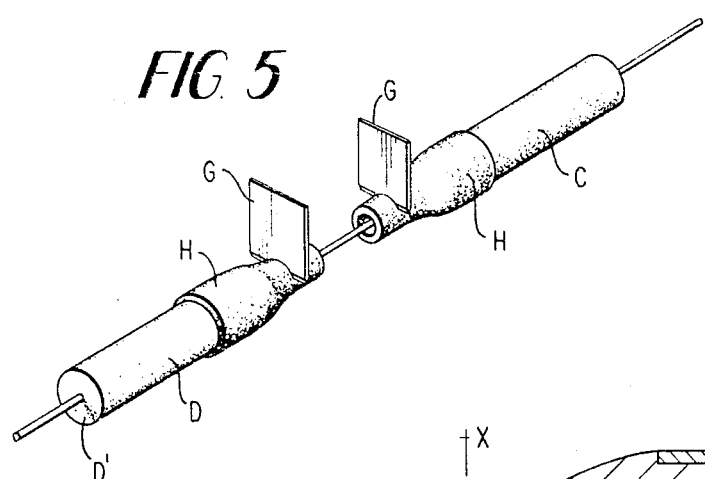
Figure 6:
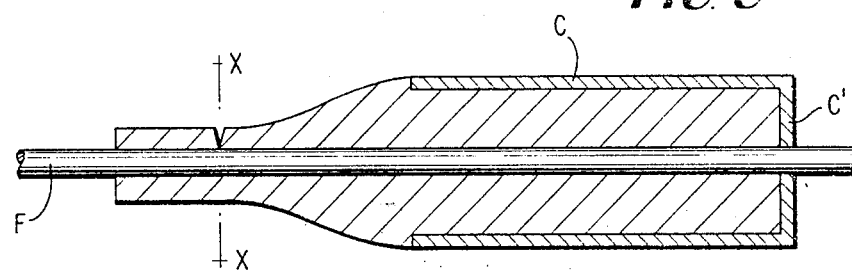
Figure 7:
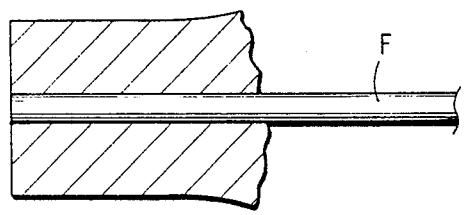
Figure 8:
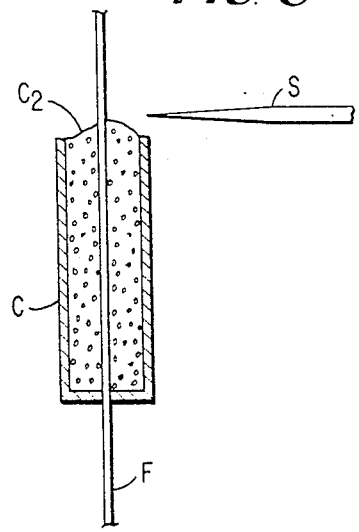
Figure 9:
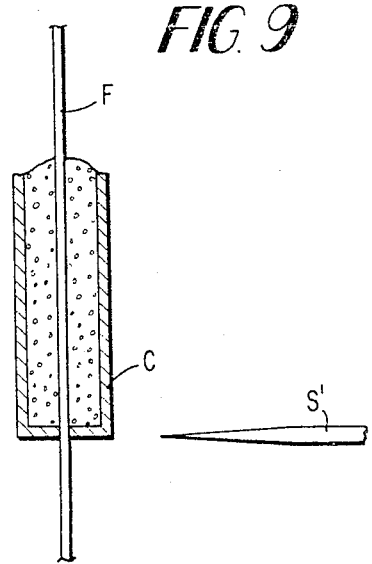

In order that the invention be more readily understood, reference will now be made to the accompanying drawings, in which:

FIG. 1 is a perspective view of one form of jig according to the invention with a length of fibre, two sleeves, and a knife edge member in position to illustrate the method of the invention, FIG. 2 is a similar perspective view showing the body embodying the Vee prisms of the jig of FIG. 1, FIG. 3 similarly shows the bed-forming body of another embodiment, FIG. 4 is a somewhat diagrammatic side view, partly in section, of an arrangement similar to that of FIG. 1, together with a hypodermic syringe in position for injecting resin material into one of the precision sleeve members, FIG. 5 is a perspective view diagrammatically illustrating the simultaneous attachment of two cylinder sleeves to adjacent end-forming portions of a fibre, FIG. 6 is an axial section showing, to a larger scale, a cylindrical sleeve with a fibre embedded in a resin body obtained by means as illustrated in FIG. 4 or 5, FIG. 7 shows, to a still larger scale, the end of the resin body with the substantially plane fibre-end obtained by snapping the body of FIG. 6 along the line X—X of FIG. 6, utilising the cleavage formed, FIGS. 8 and 9 respectively illustrate two ways of producing a cleavage for snapping a fibre-end projecting from the cylindrical sleeve which has been filled with resin material without the need of extending the sleeve as its open end by the attachment of an elastomer sleeve, FIG. 10 and FIG. 11 respectively show in perspective and in sectional side elevation a modified form of jig, and FIG. 12 shows in perspective a length of fibre coaxially aligned along two somewhat modified sleeves together with a resin body joining the two, as obtained by the jig shown in FIGS. 10 and 11.

Referring now first to FIGS. 1, 2, and 4, the jig comprises as its main constituent a prism block A having two end portions, formed with mutually aligned lengths of Vee prism I, between which the block A has been reduced in thickness by a machined flat K, whereby the two aligned mutually spaced lengths of Vee prism are obtained after a single precision Vee prism has previously been machined throughout the length of the block A. Two precision-made cylinder sleeves C and D, each closed at one end by an end wall, C' and D' respectively, that is provided with an accurately coaxial bore whose diameter closely fits the diameter of the fibre to be used, are each clamped detachably in position on the two lengths of Vee prism by clamps E, and a sleeve H, made of silicone rubber or of a similarly resiliently stretchable other elastomer and having when unstretched an internal diameter substantially smaller than the outside diameter of the sleeves C and D, is drawn with one end over that end of the sleeve C which faces the other sleeve D, while a length of single-filament glass fibre F is threaded through the hole in the end wall C' of the sleeve C to extend through the interior of that sleeve and of the elastomer sleeve H, whose free end of the elastomer sleeve H is sealed, for example by the insertion of a plug or end wall having a bore making sealing contact with the filament, which is further threaded through the bore in the end wall D' of the sleeve D. Two tensioning grips B, subject to the force of traction springs B', are applied to the filament outside the spaced Vee-bed portions I of the block A to maintain longitudinal tension on the portion of the filament extending between the two end walls C' and D'. A hard-setting resin is then injected in liquid form into the joint cavity formed by the interior of the sleeve C and of the projecting portion of the elastomer sleeve H, the injection being effected through a hypodermic needle L introduced through the sleeve H and subsequently withdrawn, while a knife edge blade G, preferably guided in the jig, for example by being mounted in a holder which keeps it at right angles to the axis of the filament, is placed in position as shown with the knife blade cutting through the rubber sleeve and making contact with the fibre F. When the resin has sufficiently hardened, the blade G is removed, the elastomer sleeve H is cut away, and after the resin has set hard, the tension applied to the fibre is released and both sleeves C and D, together with the fibre, are taken from the jig, and the resin body formed inside the elastomer sleeve H is snapped at the cleavage point formed by the knife-edge leaving the cylinder sleeve C firmly fixed to the filament, which is held rigid in the remaining part of the resin body, in accurate coaxial alignment with the sleeve, and the end face of the filament will be found to be sufficiently flat to achieve an acceptably low transmission loss when coupled in a butt joint by means of a suitable connector having a precision bore into which the sleeves C fit. FIG. 6 shows the sleeve C with the resin body and the fibre F extending through it, and with a cleavage formed by the knife edge member G. This cleavage permits the resin body with the fibre in it to be snapped along the transverse plane X—X, while FIG. 7 illustrates the end surface produced by this snapping, showing that the end of the fibre will be substantially plane and flush with the end of the resin body. If desired, both sleeves C and D may be simultaneously attached to a single fibre to produce two fibre ends, each similarly attached to a precision cylinder sleeve. For this purpose the position of sleeve D has been reversed compared to its position shown in FIG. 4, so that its open end faces the sleeve C, and each of the two sleeves C and D has been fitted with an elastomer sleeve H into each sleeve H a knife-edge blade G has been inserted.

The method of the invention can also be carried out without the use of an elastomer sleeve H. In this case the jig is preferably so placed that the sleeve C stands upright with its open end at the top, and resin material, preferably resin with a filler consisting of ground glass of a particle size between 4 and 44 micron, is filled into the open end of the sleeve forming an end surface C2 which projects somewhat in the direction of the fibre F from the open end of the sleeve C. When the resin has set hard, the fibre is snapped at a suitable point. This may be done at the free outer end of the resin body thus formed, after scoring the fibre F at this point with the help of a knife-edge blade S, as shown in FIG. 8, and although in this case it will generally be found necessary for the end of the filament to be lapped in order to obtain a suitably flat face at right angles to the axis of the fibre, the support given to the end of the fibre by the surrounding resin at a point closely adjacent to the point at which the fibre is snapped, greatly reduces the risk of edge fragmentation of the fibre which would be liable to refract light passing along the axis of the fibre. Alternatively, as illustrated in FIG. 9, a cleavage may be formed substantially in the plane of the outer surface of the end wall C' of the sleeve C by scoring the fibre by means of a chisel-shaped sapphire chip S'. In this case the subsequent snapping of the fibre has been found to generally produce a fibre end face which is sufficiently flat and sufficiently normal to the axis of the fibre, to achieve an acceptably low transmission loss through this end face.

FIGS. 10 to 12 illustrate a modification of the method and also a jig which makes it possible to attach to a length of fibre simultaneously two cylindrical end sleeves T and provide each fibre end with an end face whose quality is similar to that achieved with the method illustrated in FIGS. 1, 4 and 5 to 7, but which makes it unnecessary to employ and fit on to each of the cylindrical sleeves an auxiliary sleeve of stretchable elastomer material. The jig illustrated in FIGS. 10 and 11 has a mounting bed which is made of two precision cylinder bodies J and illustrated in FIG. 3. Two sleeves P are respectively clamped on to the two bed forming lengths of this body with their open ends facing each other over the flat N, and a mould body U is placed on to the flat N between the two sleeves P and arranged to make sealing contact with the flat N and with the end portions of the two sleeves. The sides of the mould member are formed with guide slots for a knife edge blade G, and the mould is open at the top to form a sprue T. Each sleeve P shown in this embodiment has a stepped coaxial bore P2 whose smaller-diameter portion accommodates the fibre with sufficient clearance to provide round the fibre space which can be filled with resin, and which is closed at the outer end of the sleeve by a plug Q, which has an accurately coaxial bore of a diameter fitting closely over the fibre F, while at the opposite end of the sleeve which faces the mould, the bore is formed with a relatively short portion P3 whose diameter is increased over that of the portion P2. The sleeves P shown in this embodiment also have each at its outer end an extension or collar P1 whose outside diameter is reduced in comparison to that of the main portion of the sleeve, so that a thrust sleeve V can be placed over this reduced-diameter and to form a convenient support for the spring means by which tension is applied to the fibre F.

When the parts are thus assembled, a liquid, hard-setting resin, for example an epoxy resin or a suitable polyester resin, is poured into the mould through the sprue T, and when the resin has set hard, the blade G and the mould member U are removed, and tension is taken off the fibre F. A composite body is thus obtained which is shown in perspective in FIG. 12, and in which the two sleeves P are connected by a body W of resin material, which in the illustrated embodiment has the form of a cylinder similar in diameter to the collar portions P1 of each cylinder P, which also completely fills the cavity formed by the stepped bore P2, P3, in firm contact with the filament therein, and which is integral with a sprue portion T. This body shows halfway along its length a cleavage G1, at which the resin body can be snapped, jointly with the fibre embedded therein, leaving a joint end surface of the fibre and the resin body, which is substantially normal to the length of the fibre and sufficiently plane to permit, without lapping, the achievement of a coupling connection having an acceptably low transmission loss, so that after removal of this sprue portion T, each of the two sleeves P with its resin body and the fibre embedded therein provides coupling probe for the fibre length to which it has been attached, which incorporates a coupling cylinder suitable for use in a convenient form of coupling connector.

What we claim is:

1. A jig for the accurate attachment of a surrounding sleeve to an optical fibre including means for detachably mounting in accurate axial alignment with each other a precision-made accurate axial alignment with each other, a precision-made cylindrical sleeve which is to be attached to the fibre, and which is closed at one end by an end wall having a coaxial bore closely fitting the fibre and, at an axial distance from this sleeve, a second cylindrical sleeve of similar construction; and means for releasably applying longitudinal tension to a length of fibre which has been threaded through the bores in the respective end walls of the two thus mounted cylindrical sleeves, and which extends through the whole length of at least the first-mentioned sleeve, said jig being further equipped with means for guiding a knife blade to a position at which it engages the fibre, in a plane normal to the fibre, at a predetermined point between the two mutually facing ends of the cylinder sleeves.

2. A jig as claimed in claim 1 in which the mounting means of the jig comprises a rigid support block formed with two longitudinally spaced, accurately aligned lengths of Vee guide or equivalent guide-bed means making two-line tangential contact with the cylinder sleeves, and clamping means for clamping each of the two cylinder sleeves into respective engagement with these lengths of guide-bed means.

3. A jig as claimed in claim 1 in which the guide bed means comprises two hard, precision-made cylinder bodies secured together side by side, the resulting body being formed with a flat, thereby removing the sleeve-engaging portion of the bed between the two thus spaced lengths of guide-bed.

4. A jig as claimed in claim 1 additionally comprising mould means which so co-operates with the two mutually facing open ends of the two cylindrical sleeves mounted on the guide bed means, that injection of suitable resin material into the mould will produce, after setting, a body of resin material which, in addition to two portions respectively filling the interior of both the two sleeves, comprises a connecting portion integrally joining the two said portions, the mould means being formed with guide means for knife-edge means so arranged that the knife-edge means will engage the fibre at a point halfway between the two mutually adjacent ends of the two sleeves.

* * * * *